US006609512B2

(12) United States Patent
Poe, Jr. et al.

(10) Patent No.: US 6,609,512 B2
(45) Date of Patent: Aug. 26, 2003

(54) ADJUSTABLE HEIGHT GAS GRILL (76) Inventors: Floyd L. Poe, Jr., 1038 Thomas Kelley Rd., Sanford, NC (US) 27330; Donnie B. Campbell, 747 Avents Ferry Rd., Sanford, NC (US) 27330; Steven S. Jones, Sr., 285 State Rd. 16, St. Augustine, FL (US) 32084

( * ) Notice: Subject to any disclaimer, the term of this patent is extended or adjusted under 35 U.S.C. 154(b) by 0 days.

(21) Appl. No.: 09/866,321

(22) Filed: May 25, 2001

(65) Prior Publication Data
US 2002/0179080 A1 Dec. 5, 2002

(51) Int. Cl.[7] .................................................. A47J 37/00
(52) U.S. Cl. ................................. 126/25 A; 126/41 R
(58) Field of Search ........................ 126/25 R, 9, 41 R, 126/25

(56) References Cited

U.S. PATENT DOCUMENTS 3,688,758 A     9/1972  Stephen, Jr. ............... 126/41 R
3,943,837 A  *  3/1976  Trkla ............................. 126/9
4,281,633 A  *  8/1981  Wackerman ................. 126/25
4,852,476 A     8/1989  Sanchez .................... 99/443 R
5,307,789 A     5/1994  Newby ....................... 126/9 R
5,758,635 A     6/1998  Petersen ................... 126/25 A
5,878,739 A  *  3/1999  Guidry ........................ 126/25

* cited by examiner

Primary Examiner—Henry Bennett
Assistant Examiner—Sabrina Dagostino
(74) Attorney, Agent, or Firm—Olive & Olive P.A.

(57) ABSTRACT

A gas grilling apparatus includes a mechanism for raising and lowering its gas burner grilling element while keeping it level. An associated deflector tray for the gas grilling apparatus enables the gas burner element, when in its most vertical position, to be used to cook food over direct flame while and when in its lower vertical position, to cook the food by radiant heat. The mechanism for raising and lowering the gas burner element comprises a pair of upper and lower interconnected parallel arms which are pivotally connected to the gas burner element.

22 Claims, 6 Drawing Sheets

ADJUSTABLE HEIGHT GAS GRILL

BACKGROUND OF THE INVENTION

1. Field of the Invention

The present invention relates to gas cooking grills. More particularly, the present invention relates to a gas grilling apparatus, a mechanism for raising and lowering its gas burner unit and a tray which allows food to be grilled either by being exposed directly to the gas flame or to radiated heat.

2. Description of Related Art

The terms "gas grilling apparatus" and "gas grill" as used herein refer to devices designed to grill or cook foods using heat supplied by a combustible gas source. The terms refer specifically to devices sold as gas grills on which foods are cooked outdoors primarily over a gas flame.

The art relating to food grills illustrates a wide variety of gas grills and charcoal grills with mechanisms for adjusting heat source height in order to regulate the temperature and manner in which foods are cooked. Many attempts have been made to find a satisfactory method to keep the heat source level during such heat source height adjustment. For example, in U.S. Pat. Nos. 3,688,758 to Stephen and 4,281,633 to Wackerman, kettle type grilling apparatus are disclosed in which the heat source is movable via a height adjustable center post. U.S. Pat. No. 3,943,837 to Trkla discloses a chain mechanism for lifting both the fuel tray and the grill. In U.S. Pat. No. 5,758,635 to Petersen, a series of pulleys and cable are disclosed which, through use of a crank, raise and lower a firebox. In U.S. Pat. No. 4,852,476 to Sanchez, a vertical height adjustment means is disclosed involving cables at the corners of a burner support mechanism which fits into a track to keep it substantially level. In U.S. Pat. No. 5,878,739 to Guidry, a combination gas/charcoal grill is disclosed. In the '739 patent, the separately formed gas burner unit, charcoal tray and deflector shield are interconnected so that they can be vertically adjusted via a single pivoting handle. The gas burner is kept level by pivotal connections at the ends of the gas burner which keeps the gas burner charcoal tray and deflector shield level by means of gravity. The gas burner flame itself is adjustable in intensity and the deflector shield is provided with holes to permit the passing of flame therethrough. This grill has disadvantages, however, in that the relationship of the burner to the deflector is fixed and thus it is not possible to have full or even partial heat without the flame passing through the holes in the shield. Further, the distance between the gas burner and charcoal tray is not adjustable leading to further lack of control over the cooking process. In addition, the vertical height adjustment mechanism can misalign over time both horizontally and vertically leading to uneven cooking and other burner related problems.

Therefore, it would be desirable to provide a gas fired grilling apparatus which allows a choice in use of direct cooking over a flame or indirect cooking by radiant heating of a deflector tray while maintaining the ability to cook evenly. It would further be useful to have a stable, level gas burner that can be vertically adjusted and is much less likely to become misaligned over time. The object of the invention is thus to provide a gas fired grilling apparatus which operates in the way described. Other objects will become apparent as the description proceeds.

SUMMARY OF THE INVENTION

The present invention is directed to a gas grilling apparatus and in particular a grilling apparatus having a gas burner element that is vertically adjustable in relationship to a deflector tray and in such a way as to allow the gas burner element to remain level during its vertical adjustment. A deflector tray provides a combination deflector shield for cooking by radiant heat and a gas briquette tray for holding gas grill briquettes used in grilling food. The invention apparatus also provides the ability to cook directly over a flame or to cook by indirect heat when desired while maintaining the ability to adjust flame height and distance of the flame from the food being cooked. The apparatus of the invention also provides the ability to prevent or extinguish flame flare-ups and the ability to move the gas burner separate from the deflector tray. The invention apparatus also provides drain holes that aid, via gravity, in the removal of grease and debris.

DETAILED DESCRIPTION OF THE PREFERRED EMBODIMENTS

Prior to the more detailed description to follow there will be first given a general description of the invention.

Specifically, the gas grilling apparatus comprises: (a) an openable enclosure; (b) a grilling support member positioned within the enclosure; (c) a vertically adjustable gas burner element connectable to a combustible gas source and positioned beneath the grilling support member within the enclosure; (d) a deflector tray corresponding in size to the grilling support member and positioned in the enclosure between the food support member and the gas burner element essentially in register with the food support member; and (e) a vertical adjustment mechanism controlled external to the enclosure to vertically adjust the height of the gas burner element.

The "enclosure" as referred to above is a box or container designed to contain the cooking elements of a gas grill apparatus of the invention. In a preferred embodiment, the enclosure is a rectangular shaped container that is open at the top and may be closed with a lid that is hinged. Other shapes such as square, round, kettle and the like with lids that are removable or hinged will also be useful in the practice of the present invention. The enclosure may have vents located at various positions on the enclosure including the lid and may have access panels to facilitate entry into the enclosure from other than the top. Holes may be made in the enclosure as well for passing the tubes of combustible gas such as propane from a tank to the gas burner element and for passing debris away from the deflector tray. The enclosure can be made of any material normally used to manufacture gas grills. Preferred materials are stainless steel and iron.

The "grilling support member" refers to the device or structure on which food is placed to cook. Normally with the lid off or in the open position, the grill support member, roughly equivalent in size to the size of the enclosure, fits horizontally at the top of the open enclosure. Food is placed directly on the grilling support member for grilling, charring, or cooking. It can be a perforate member or may consist of crossed bars or grates and made of cast iron, steel, or other appropriate heat resistant material.

The "gas burner element" of the invention is designed to use a combustible gas, such as natural gas or propane from some source such as a tank, and through a series of holes in the gas burner element produce a flame for cooking. The gas burner element may have one or more controls for adjusting the height of the flame and may include self-igniting capabilities. The temperature achieved for cooking depends on the gas burner element chosen, the number of controls, fuel type, and the like. The gas burner element also may consist of a number of individual gas burners which allow for separate flame control to each individual gas burner comprising the gas burner element. The preferred gas burner element comprises two individual gas burners with separate controls for flame height and a self-ignition mechanism.

The "deflector tray" is a combination deflector shield and gas briquette tray. The deflector tray is roughly the same size as the grilling support member and is positioned horizontally below it in register in the enclosure. This deflector tray serves several functions. The deflector tray, which can be made of stainless steel or other durable metal, will act to radiate heat to the food being cooked, especially when heated from below when the gas burner is in a lowered position which allows the gas flame to be deflected by the tray. Cooking this way prevents flare-ups and allows for slow even cooking of food. The deflector tray also has at least one opening positioned so that when the gas burner element is in the elevated position flame from the gas burner element passes therethrough for searing steaks or other foods. Further, upstanding lip edges of the deflector tray retain and allow use of gas grill briquettes, such as ceramic, lava rock, or other materials that are used in gas grills and which are normally shaped to simulate real charcoal and radiant heat. The deflector tray may also and preferably does have a raised portion having an open bottom, sidewalls with one or more openings and a top wall extending lengthwise and centrally of the width of the deflector tray. This raised portion is adapted to receive the gas burner element when in its elevated vertical position.

The vertical adjustment device used in the apparatus acts to keep the gas burner element level during its vertical adjustment and without requiring that it be attached in fixed relationship to other active parts of the grilling apparatus such as a grilling support member, charcoal tray or deflector shield. The vertical adjustment device comprises a pair of upper parallel and lower parallel arms mounted at the inner ends on rods about whose axis it pivots. The pair of lower parallel arms are vertically pivotal at the proximal end of each near the rear of the enclosure and each lower arm extends to a distal end located near the front of the enclosure. The pair of upper parallel arms are vertically pivotal at the proximal end of each near the rear of the enclosure and each upper arm extends to a distal end located near the front of the enclosure. Each of the upper parallel arms is positioned above and substantially in the same vertical plane as one of the lower arms. A vertical interconnecting mechanism extends between outer portions of each pair of the upper and lower parallel arms and which helps stabilize and keep each pair of upper and lower arms in parallel relationship. A connecting arm also extends between outermost portions of the pair of lower parallel arms and moves with the lower arms as they pivot when the gas burner is vertically adjusted. More than one interconnecting means between the lower and upper pair of arms may be provided when desired for additional stability.

A novel feature of the invention apparatus is the ability of the vertical adjustment device to raise and lower the gas burner element into and out of a raised portion in the deflector tray which is adapted to receive the gas burner. When the gas burner is in the raised portion, it lines up with holes in the deflector tray which allows flame to pass through the holes in the tray and be used to char food. When the gas burner element is not in the raised portion, it heats the deflector tray from beneath which in turn radiates heat to cook food without charring. The deflector tray also prevents flare-ups caused by grease when the gas burner element is in a lowered position. Debris and grease is taken away from the tray via holes or tubes positioned in a lower portion of the tray.

With the general description given above as background, there is now given a more detailed description in reference to the drawings.

Figure 1:
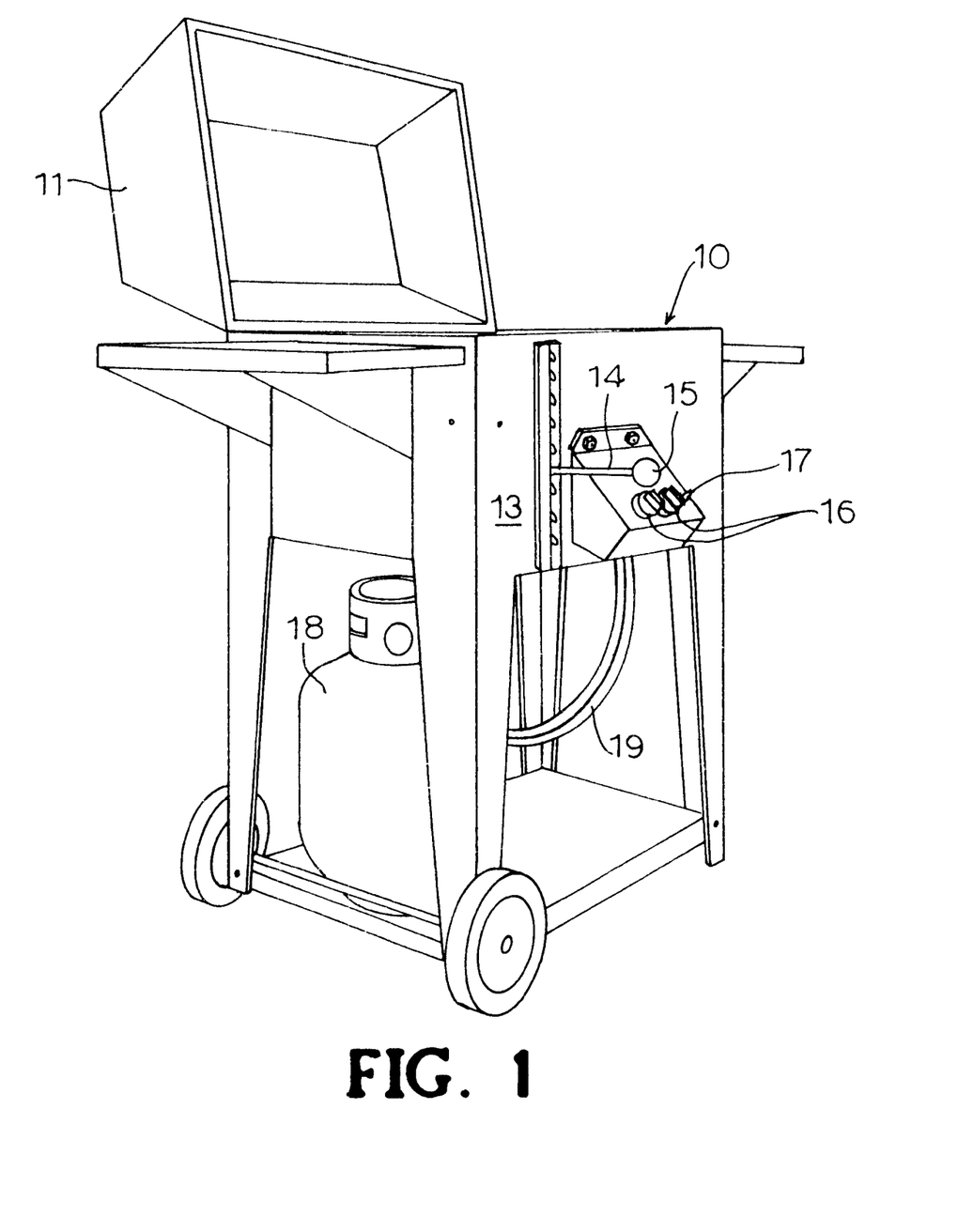
FIG. 1 is a perspective view of the gas grill apparatus of the present invention.

Referring now to the drawings, FIG. 1 is a perspective view of the enclosure 10 of the invention. The enclosure is in an open position with hinged lid 11 in a fully open position. The front of the enclosure 13 has the handle 14 of the vertical adjustment mechanism (see FIG. 2) midway in terms of height in a notched position. Also shown is a front panel member 13 on the front of the enclosure 10 with two gas burner, flame height adjustment knobs 16 and self-starting gas ignition switch 17. Also shown is combustible gas supply tank 18 with combustible gas supply lines 19.

Figure 2:
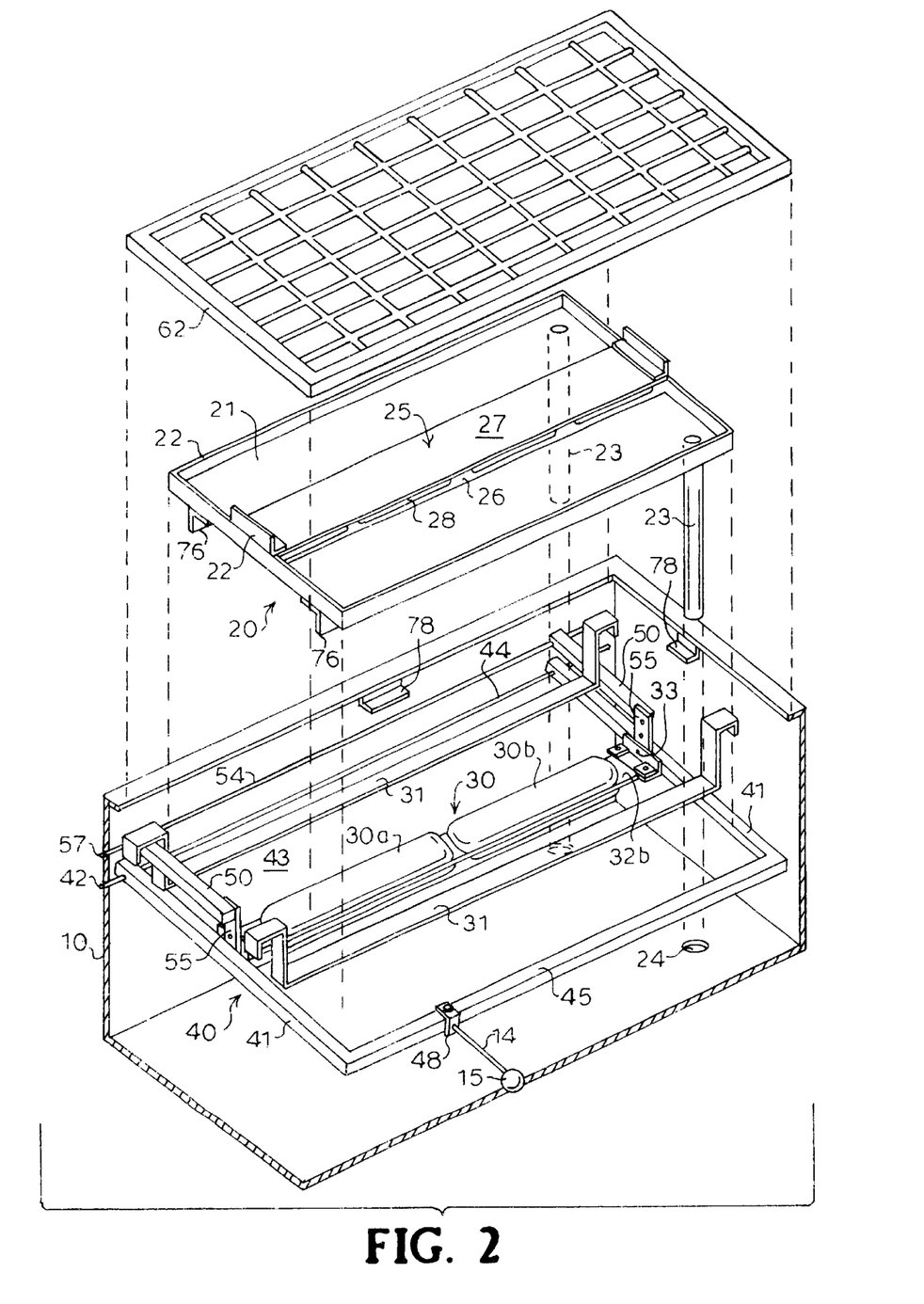
FIG. 2 is an enlarged, exploded, fragmentary, perspective view of the gas grill apparatus
Figure 3A:
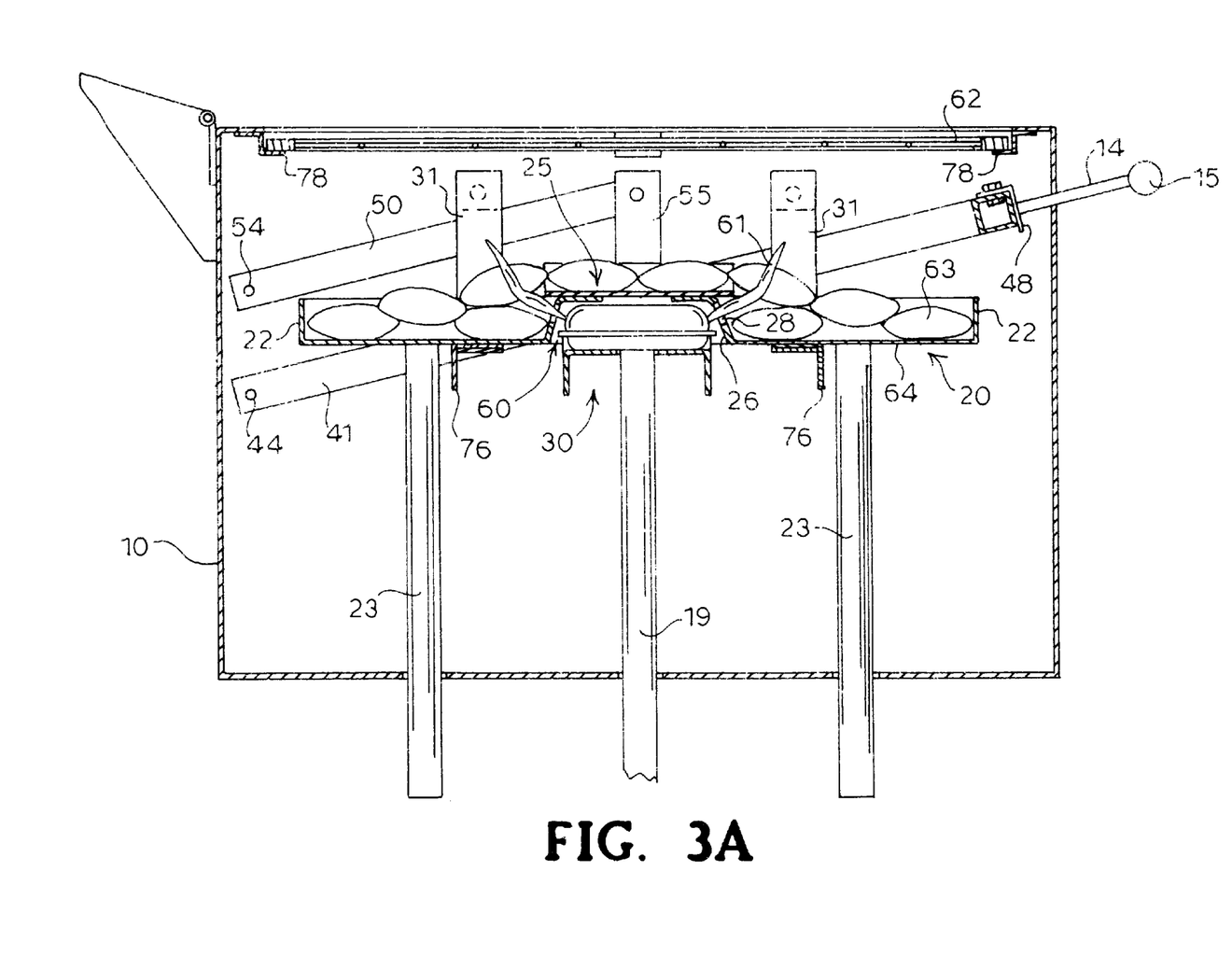
FIG. 3A is a cut-away cross section side view of the enclosure showing the deflector tray, gas burner element and grilling support member with the gas burner element positioned in its most vertical position.
Figure 3B:
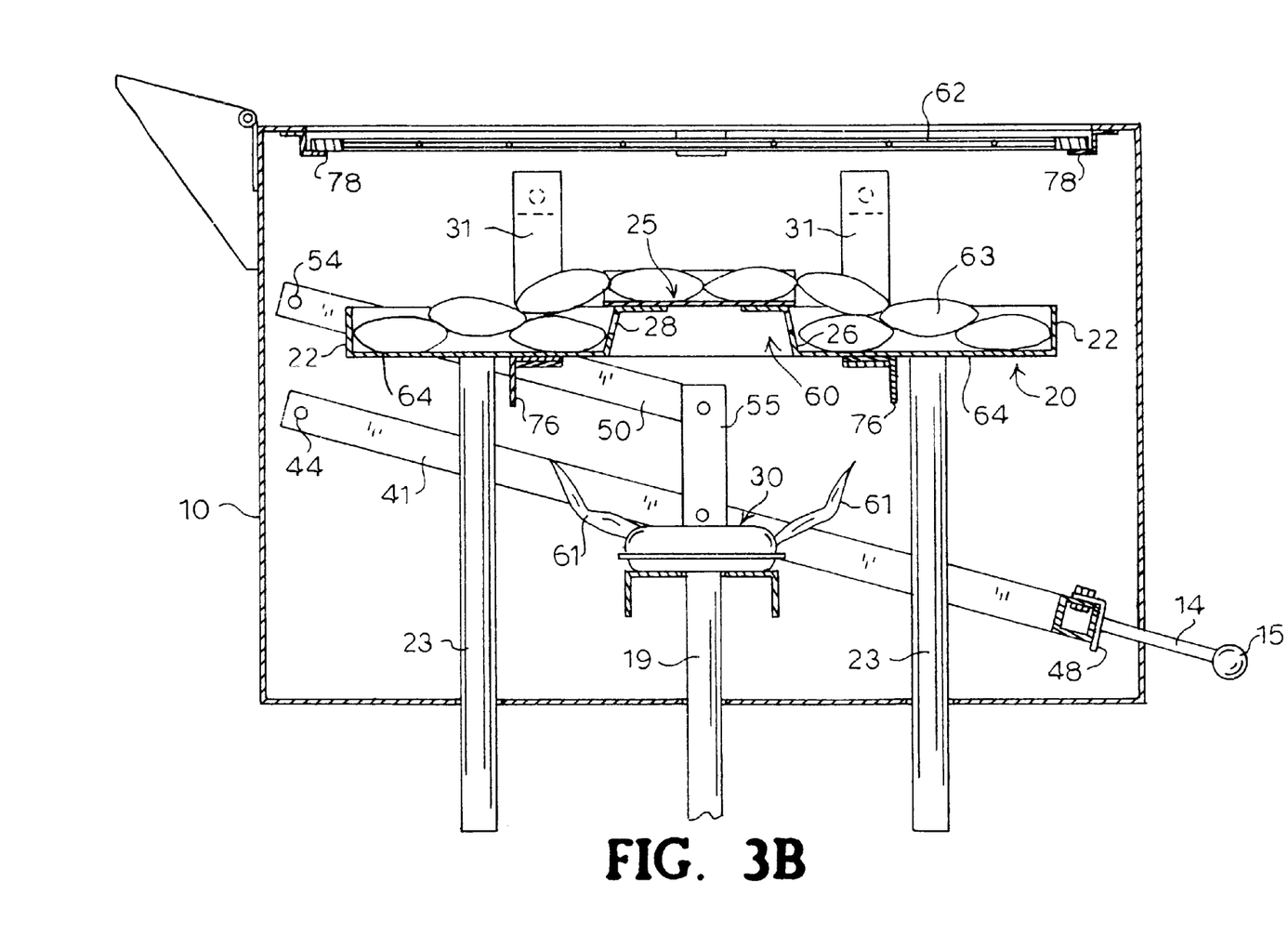
FIG. 3B is a cut-away cross section, side view of the deflector tray, gas burner element and grilling support member with the gas burner element positioned in its least vertical position.

FIG. 2 is an exploded perspective view of the mechanism installed inside of the enclosure 10. A grilling support member 62 is positioned in the enclosure 10 for grilling or charring food. As shown, deflector tray 20 comprises a rectangular plate bottom 21 with upstanding lips 22 on all four sides. Toward one end of the deflector tray 20 are two elongate tubes 23 which are hollow and allow grease and debris which accumulate on deflector tray 20 to drain down elongate vertically positioned tubes 23 and out holes 24 in the bottom of enclosure 10 for collection in a suitable receptacle, not shown. Extending lengthwise and centrally of the width of deflector tray 20 is raised portion 25 having an open bottom 60 (as seen in FIGS. 3A and 3B), side walls 26 and top wall 27. A plurality of openings 28 or elongated slits are provided in both sidewalls 26. Raised portion 25 is adapted to receive gas burner element 30 when it is adjusted to its most elevated position and permit flames from gas burner element 30 to pass through each of openings 28. Deflector tray 20 is shown in the exploded configuration of FIG. 2 out of its functioning position in enclosure 10. Deflector tray 20 fits into enclosure 10 according to the dashed lines shown in FIG. 2 and is supported in enclosure 10 on support brackets 31.

Gas burner element 30 consists, in the preferred embodiment, of two separate and independently functioning gas burners 30a and 30b which are arranged end to end underneath the bottom of deflector tray 20. Gas burner element 30 is attached at opposite ends 32a (hidden but identical to 32b) and 32b to a pivot member 33. Gas burner element 30 remains level in both its lowered and elevated position due to the effects of gravity and gas burner element 30 being centered as it hangs by pivot member 33 at its pivot point. Gas burner element 30 can be pivotally attached to either lower arms 41, upper arms 50 or in the case of the preferred embodiment shown in FIG. 2, pivotally attached to pivotal bracket 55 which interconnects each pair of upper parallel arms 50 with lower parallel arms 41 beneath it.

Vertical adjustment device 40 is used in the present invention as a preferred method for vertically adjusting the height of gas burner element 30. This preferred embodiment comprises the previously referred to pair of lower parallel arms 41 which have a pivot point 42 at the rear wall 43 of the enclosure 10 in the proximal end of each of lower parallel arms 41. Lower parallel arms 41 are made of steel, iron or other heat resistant material and in this example have a hollow, squared cross section of steel. The means for pivoting the lower parallel arms 41 is a rod 44 to which arms 41 are secured and which is pivotally mounted horizontally in enclosure 10 and also acts to interconnect lower parallel arms 41 and allows both of them to pivot together. Lower parallel arms 41 are also interconnected via cross bar 45 at the distal end of the lower parallel arms near the front of the enclosure. Cross bar 45 is welded to the distal ends of the lower parallel arms 41. Pivotally attached to cross bar 45 is handle 14 with handgrip 15. The pivotal mounting of the handle 14 is via horizontally pivotal attachment 48. Grasping handgrip 15 and raising or lowering handle 14 correspondently vertically pivots the vertical adjustment device 40 which vertically raises and lowers gas burner element 30.

Vertical adjustment mechanism 40 also includes the previously referred to pair of upper parallel arms 50 which have a pivot point 57 at a proximal end of the upper parallel arms 50 near the rear wall 43 of the enclosure via a second pivot rod 54 to which arms 50 are secured and which like pivot rod 44 pivots in the enclosure and also acts to interconnect the upper parallel arms 50. Each pair of upper and lower parallel arms 50 and 41 are interconnected via the previously referred to pivotal bracket 55.

FIGS. 3A and 3B show a cut away cross section of the enclosure 10. In FIG. 3A, the vertical adjustment mechanism 40 from FIG. 2 is in its most vertical position which fits burner element 30 into open bottom 60 of deflector tray 20. In this perspective, it can be seen that flames 61 emanating from the gas burner element 30 will pass through the openings 28 in side walls 26 of raised portion 25 within deflector tray 20 and avoid direct contact with underside 64 of deflector tray 20. This allows charring of steaks, chicken and other foods when placed on grilling support member 62. Gas grill briquettes 63 are also shown in deflector tray 20 and kept in place by lips 22.

In FIG. 3B, the vertical adjustment mechanism 40 from FIG. 2 is in its least vertical position. In this position, flames 61 from gas burner element 30 do not pass through openings 28 but rather are directed to the underside 64 of deflector tray 20 and cause heating of both tray 20 and gas grill briquettes 63. This is useful for cooking foods by radiant heat which require a longer cooking time and for which charring is not desirable.

Figure 4:
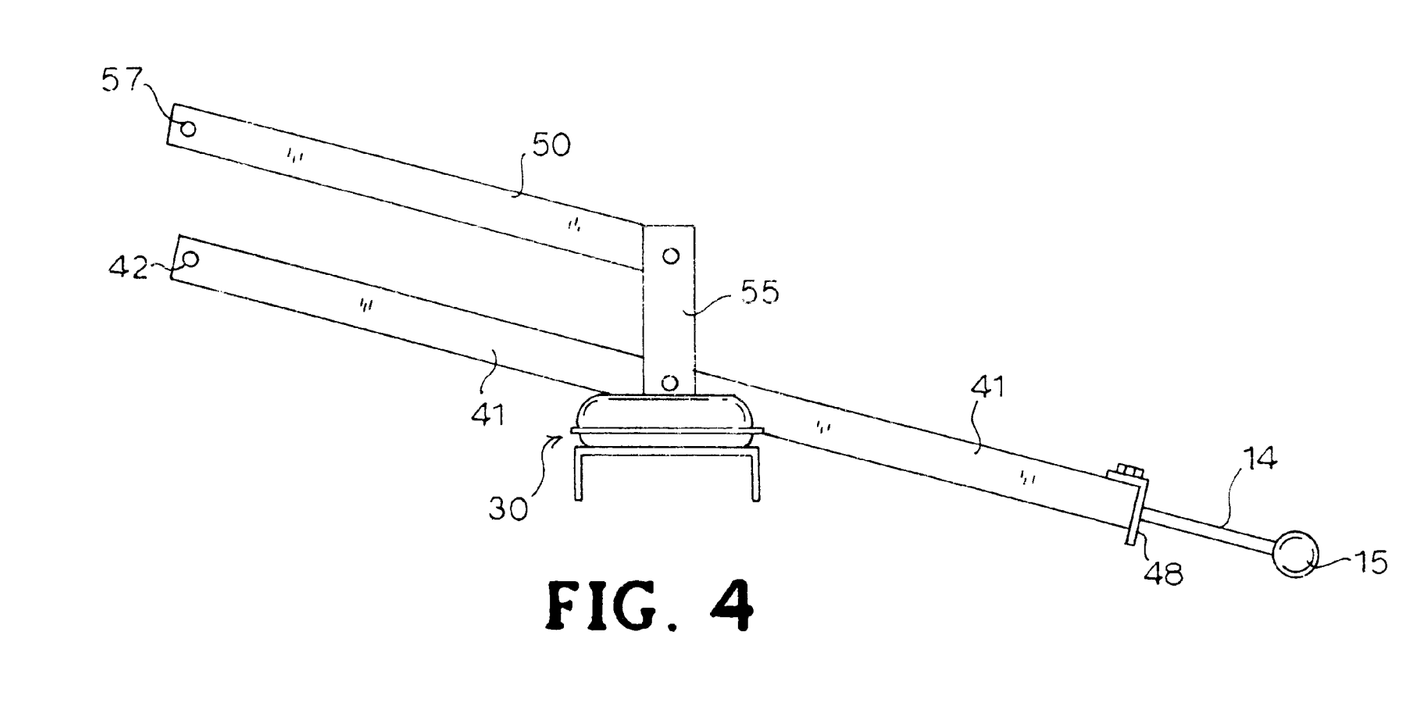
FIG. 4 is a side view of one set of arms of the vertical adjustment device showing a pair of upper and lower arms with a pivotal means for interconnecting.

FIG. 4 shows a side view of a portion of vertical adjustment mechanism 40 from FIG. 2. FIG. 4 shows, isolated from enclosure 10, an upper parallel arm 50, a lower parallel arm 41, pivoting axis 42 and 57 and pivotal bracket 55 for interconnecting upper and lower parallel arms 50 and 41. Gas burner element 30 is shown positioned in its least vertical position pivotally attached to the pivotal bracket 55. In this embodiment, handle 14 and handgrip 15 are attached directly to lower parallel arm 41 instead of to cross bar 45 of FIG. 2.

Figure 5A:
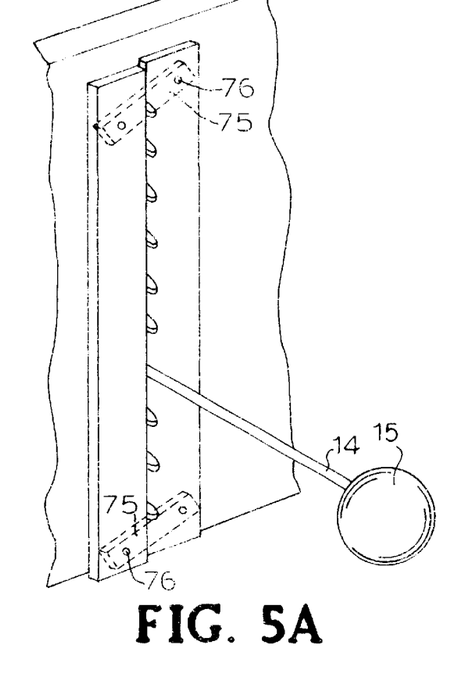
FIG. 5A is an enlarged, fragmentary, perspective view of the gas grill apparatus showing the handle of the lever mechanism for vertical adjustment of the gas burner element in a locked position.
Figure 5B:
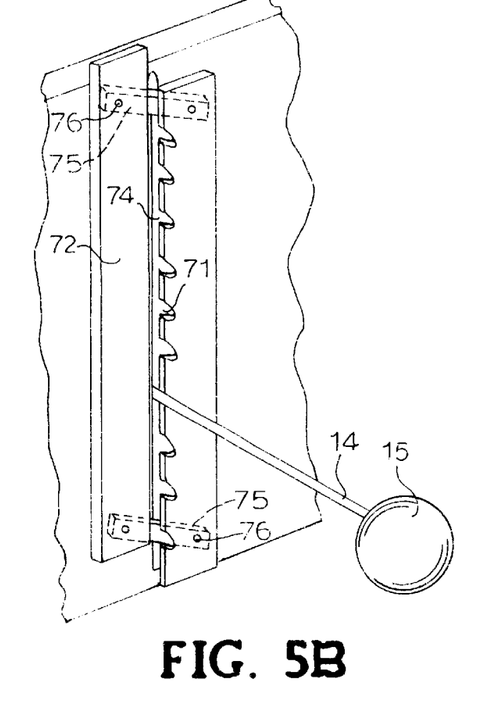
FIG. 5B is an enlarged, fragmentary, perspective view of the handle of the lever mechanism for vertical adjustment of the gas burner element within the vertical height adjustment channel.

FIGS. 5A and 5B show an enlarged fragmentary view of the front of enclosure 10. Handle 14, with its handgrip 15, passes through the enclosure. The height of gas burner element 30, as previously shown, is achieved by movement of handle 14 into channel 74 from one of the notches 71 then lifting or lowering handle 14 to the desired height. The vertical height is locked in place by movement of the handle 14 back into one of notches 71. As can be seen in FIG. 5A, there is a channel cover 72 on one side of the notches 71 mounted to bear on the channel 70 and notches 71, the channel cover 72 being operable to press against the handle 14 when engaged in a selected notch. Pivoting means 75 with pivot points 76 is mounted inside of enclosure 10 such that channel cover 72 will press against handle 14 by gravity. When handle 14 is moved into the channel 70, channel cover 72 moves aside to allow vertical movement of the handle 14 in the channel 70.

Figure 6:
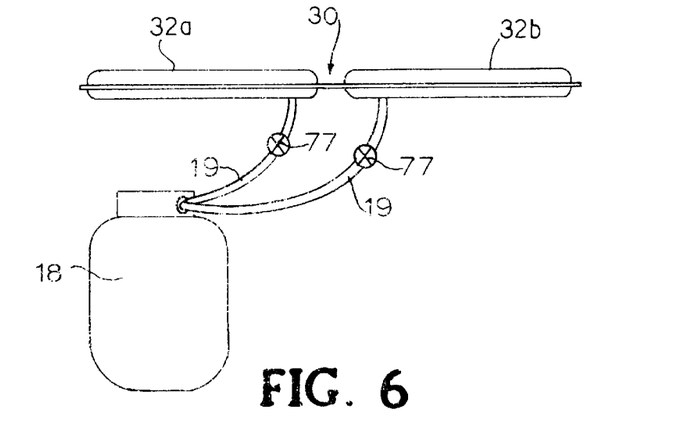
FIG. 6 is a schematic view of the combustible gas supply attached to the gas burner element.

FIG. 6 is a schematic view illustrating the attachment of a combustible gas source 18 to the gas burner element 30. In this case, a propane tank is hooked up to each of the gas burners 32a and 32b which comprise gas burner element 30 via gas lines 19 which also have connecting valves 77. Other sources such as a buried gas tank or natural gas source could also be used.

Although the presently preferred embodiments of the invention are described and shown herein, it will be apparent to those skilled in the art to which this invention pertains that variations and modifications of the described invention may be made without departing from the spirit and scope of the invention as claimed herein.

What is claimed is:

1. A gas grilling apparatus comprising:
   (a) an openable enclosure;
   (b) a grilling support member positioned within the enclosure;
   (c) a vertically adjustable gas burner element located within said enclosure below said grilling support member and positionable in elevated and lowered vertical positions, said element being adapted for connection to a combustible gas source;
   (d) a deflector tray formed to provide support for gas grill briquettes, corresponding in size to said grilling support member and said gas burner element, positioned essentially in register with said food support member having at least one opening positioned to pass flame from said gas burner element therethrough when said gas burner element is in said elevated vertical position and being operative to deflect said flame when said gas burner element is in said lowered vertical position; and
   (e) a vertical adjustment mechanism connected to said gas burner element and having a control member located so as to be positionable at a location externally of said enclosure to vertically adjust the vertical position of said gas burner element relative to said tray.

2. A gas grilling apparatus according to claim 1 wherein said deflector tray includes a raised portion having an open bottom, side walls having at least one said opening and a top wall extending lengthwise and centrally of the width thereof; said raised portion being adapted to receive said gas burner element when in said elevated vertical position and pass said flame through said opening.

3. A gas grilling apparatus according to claim 1 wherein said vertical adjustment mechanism comprises a pair of lower parallel arms vertically pivotal at proximal ends thereof located proximate the rear of said enclosure and at distal ends thereof located proximate the front of said enclosure connected to pivotally support opposite ends of said gas burner element.

4. A gas grilling apparatus according to claim 3 wherein said pair of lower parallel arms are interconnected at said distal ends.

5. A gas grilling apparatus according to claim 3 wherein said pair of lower parallel arms are interconnected at said proximal ends.

6. A gas grilling apparatus according to claim 3 wherein said pair of lower parallel arms are interconnected at both said distal and proximal ends.

7. A gas grilling apparatus according to claim 5 wherein said vertical adjustment mechanism comprises a lever mechanism connected to a cross bar interconnecting said distal ends of said lower parallel arms proximate the front of said enclosure, said mechanism further comprising a handle formed for being gripped by a user of said gas grilling apparatus thereby enabling said gas burner element to be vertically adjusted by manual vertical adjustment of said handle.

8. A gas grilling apparatus according to claim 6 wherein said vertical adjustment mechanism comprises a lever mechanism connected to a cross bar interconnecting said distal ends of said lower parallel arms proximate the front of said enclosure, said mechanism further comprising a handle formed for being gripped by a user of said gas grilling apparatus thereby enabling said gas burner element to be vertically adjusted by manual vertical adjustment of said handle.

9. A gas grilling apparatus according to claim 1 wherein said enclosure includes a front wall formed with a channel having a plurality of notches at predetermined elevations on one side of said channel, and said control member comprises a handle extending through said channel and adapted to engage a selected said notch at a chosen predetermined elevation in order to locate said burner element at a corresponding vertical position.

10. A gas grilling apparatus according to claim 3 wherein said vertical adjustment mechanism further comprises a pair of upper parallel arms vertically pivotal at proximal ends thereof located proximate the rear of said enclosure and terminating at distal ends thereof located proximate the front of said enclosure and wherein each of said upper parallel arms is positioned above and vertically aligned with a respective one of said lower arms and is joined thereto by pivotal connections.

11. A gas grilling apparatus according to claim 10 wherein said lower parallel arms are interconnected by means of a pivotally mounted rod extending between said proximal ends of said lower parallel arms.

12. A gas grilling apparatus according to claim 1 wherein said enclosure includes a cover hingedly attached to a back wall of said enclosure thereby permitting said enclosure to be opened and closed.

13. A gas grilling apparatus according to claim 1 wherein said deflector tray includes a tube extending between a lower portion of said tray and through a lower portion of said enclosure for passage of accumulated waste.

14. A gas grilling apparatus according to claim 9 further comprising a spring-loaded channel cover located on one side of said channel opposite said notches and mounted so as to bear on said handle when engaged in a selected notch.

15. A vertical adjustment device for a gas burner element positioned in an enclosure of a gas grilling apparatus comprising:
   (a) a pair of lower parallel arms and mounted so as to be vertically pivotal at a proximal end of each proximate the rear of said enclosure and having distal ends located proximate the front of said enclosure;
   (b) a pair of upper parallel arms mounted so as to be vertically pivotal at a proximal end of each proximate the rear of said enclosure and having distal ends located proximate the front of said enclosure, each of said upper parallel arms being positioned above and vertically aligned with a respective one of said lower parallel arms and joined thereto by pivotal connections;
   (c) a vertical adjustment mechanism connected to said arms and operative to vertically pivot said arms simultaneously; and
   (d) a gas burner element pivotally supported at opposite ends on said lower arms and held level during vertical movement thereof.

16. A gas grilling apparatus adapted for use of either gas or charcoal or both as a fuel source comprising:
   (a) an enclosure formed by opposed front and back walls, opposed end walls and a bottom wall and having a top opening bordered by said front, back and end walls;
   (b) a perforate grill member supported by said walls proximate said opening;
   (c) a cover hingedly attached to an upper edge portion of said back wall for opening and closing said opening;
   (d) a tray sized to pass through and substantially corresponding in size to the size of said opening, said tray being supported within said enclosure below said grill member and formed so as to permit passage of gas flames through openings in said tray for contact with heated material stored on said tray;
   (e) a vertically positionable burner element located below and extending lengthwise of said tray and having means for being connected to a gas source; and
   (f) a lever mechanism arranged to be manually adjustable externally of said enclosure and mounting said burner element so as to permit vertical adjustment of said burner element relative to said tray.

17. A grilling apparatus as claimed in claim 16 wherein said lever mechanism comprises a pair of interconnected parallel arms pivotally mounted at respective inner ends thereof and extending outwardly from said back wall, and having outer ends pivotally supporting opposite ends of said burner element outwardly of said back wall.

18. A grilling apparatus as claimed in claim 17 wherein said arms are arranged to pivot in vertical planes substantially parallel to said end walls.

19. A grilling apparatus as claimed in claim 17 wherein said lever mechanism includes a frame mounted so as to be pivotal in unison with said arms and a handle having an inner end secured to said frame and extending outwardly from said frame through a slot provided in said enclosure to an outer end formed for being grasped by the user of said apparatus thereby enabling said burner to be vertically adjusted with respect to said tray by manual vertical adjustment of said handle in said slot.

20. A grilling apparatus as claimed in claim 16 wherein said tray includes a raised portion having an open bottom, side walls with openings and a top wall extending lengthwise and centrally of the width of said tray, said raised portion being adapted to receive said burner when elevated and pass gas flames produced thereby through said side wall openings.

21. A grilling apparatus as claimed in claim 20 including a tubular passage extending from a bottom wall of said tray through said enclosure bottom wall for passage of waste accumulated in said trays.

22. A grilling apparatus as claimed in claim 14 wherein said slot is formed on one side with notches at different elevations shaped to receive and locate said handle at corresponding elevations and including a spring-loaded plate member mounted on one side of said slot in a manner which permits said handle to be able to move either away from or into a selected one of said notices and when in a selected one of said notches to be held in position by the force of said plate member bearing on said handle.

* * * * *